(12) United States Patent
Goesmann et al.

(10) Patent No.: US 6,798,638 B2
(45) Date of Patent: Sep. 28, 2004

(54) POT-SHAPED HOUSING AND COVER FOR CAPACITORS

(75) Inventors: Hubertus Goesmann, Auernheim (DE); Stefan Nowak, Heubach (DE); Werner Erhardt, Ballendorf (DE); Klaus Schoch, Nattheim (DE)

(73) Assignee: EPCOS AG, München (DE)

( * ) Notice: Subject to any disclaimer, the term of this patent is extended or adjusted under 35 U.S.C. 154(b) by 165 days.

(21) Appl. No.: 10/112,852

(22) Filed: Mar. 29, 2002

(65) Prior Publication Data

US 2003/0184949 A1 Oct. 2, 2003

(51) Int. Cl.[7] .................................................. H01G 4/00

(52) U.S. Cl. ..................................... 361/301.3; 174/52.1

(58) Field of Search ....................... 174/52.1; 361/301.1, 361/301.3

(56) References Cited

U.S. PATENT DOCUMENTS 6,256,188 B1 * 7/2001 Lovkvist et al. .......... 361/301.3

OTHER PUBLICATIONS

"Ultra Cap 100F/2.3V", www.epcos.com/ultracaps.
"Easier to Assemble", *EPCOS Components*, Apr. 2001.

* cited by examiner

*Primary Examiner*—Hung V. Ngo
(74) *Attorney, Agent, or Firm*—Schiff Hardin LLP

(57) ABSTRACT

A pot-shaped housing with a cover for capacitors has the pot-shaped housing and cover both being extruded as single workpieces and having different spatial dimensions along two principal axes so that they form either a rectangular or square. The cover is provided with two electrical terminals, preferably with one of the terminals being conducted through an opening in the cover and the other terminal preferably being integrally formed with the cover. The cover has a bent-up edge on its periphery in an interlocking fashion with the opening in the housing pot.

14 Claims, 5 Drawing Sheets

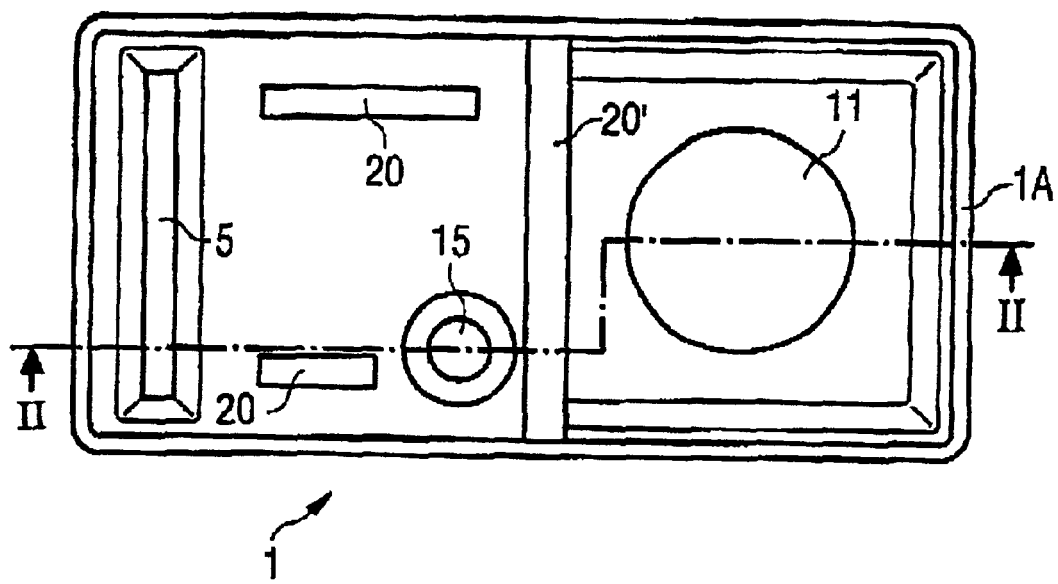
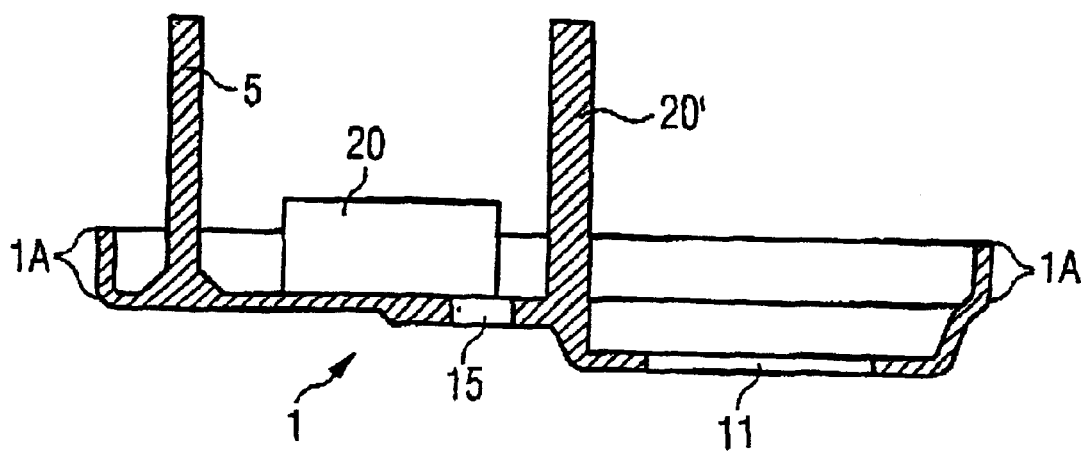

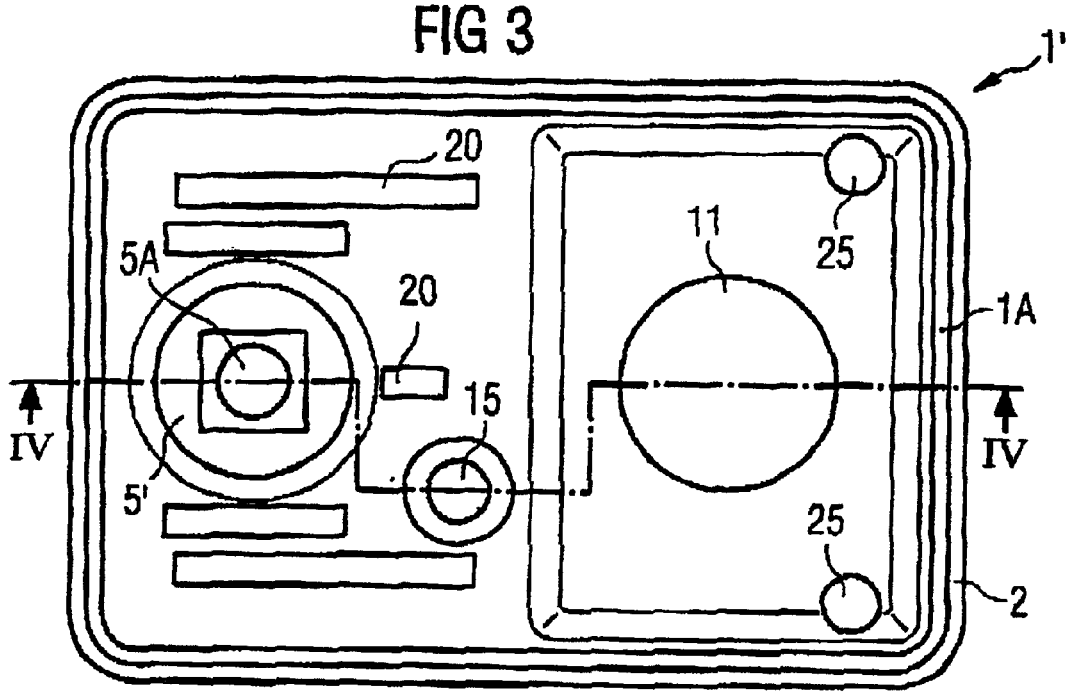
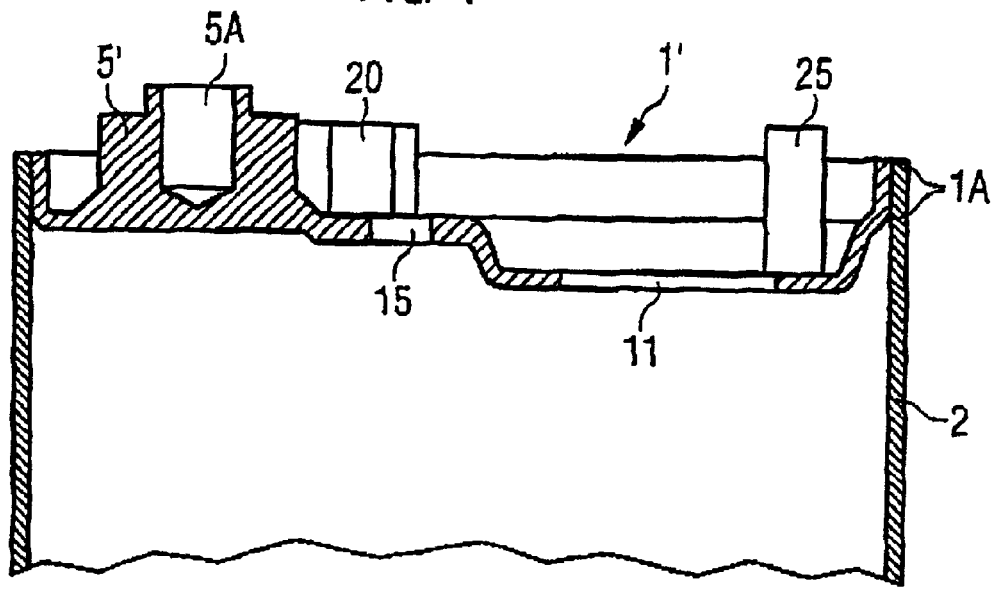

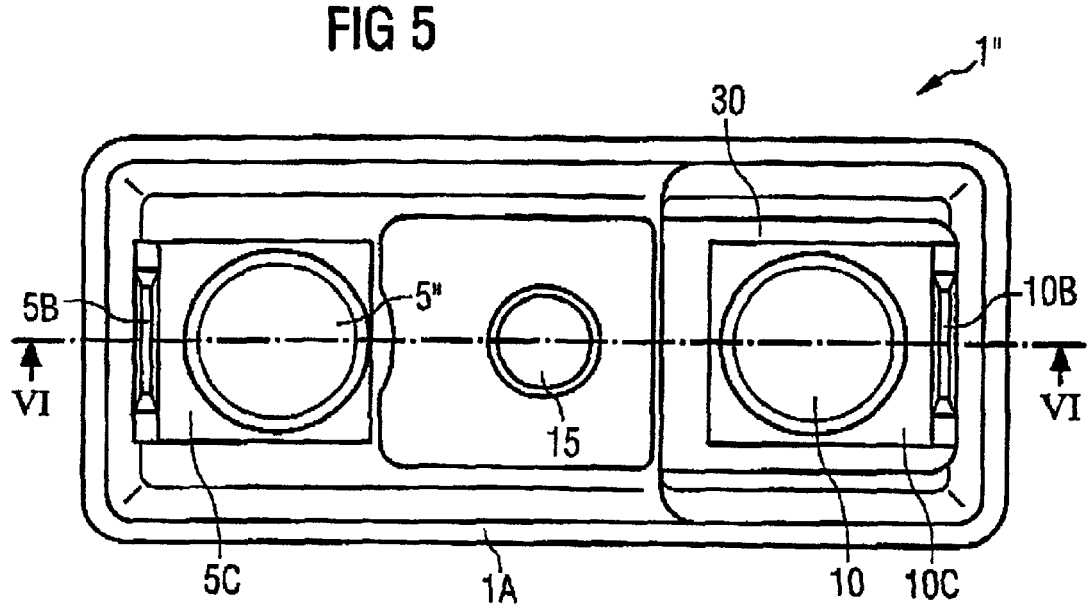
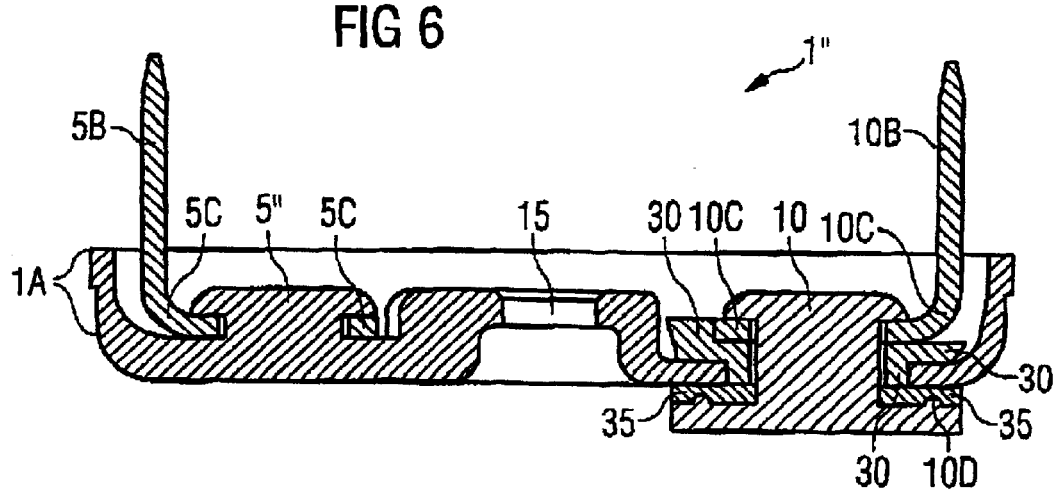

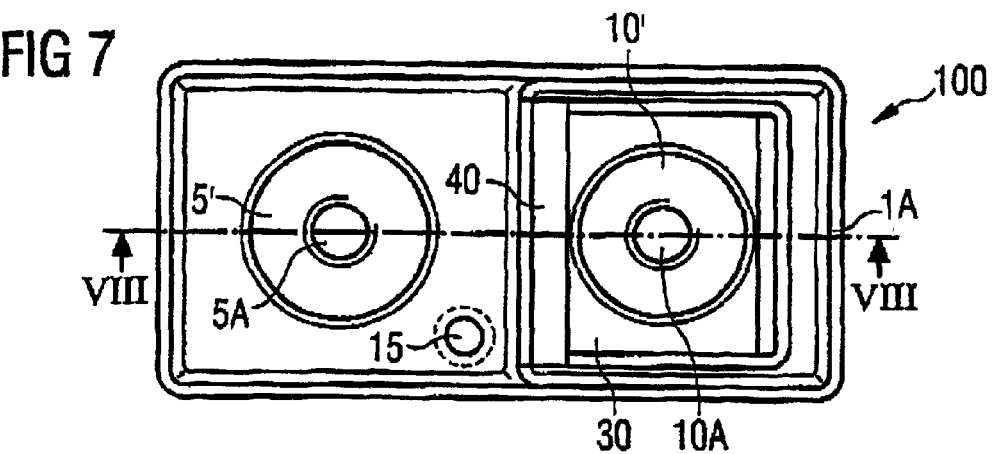
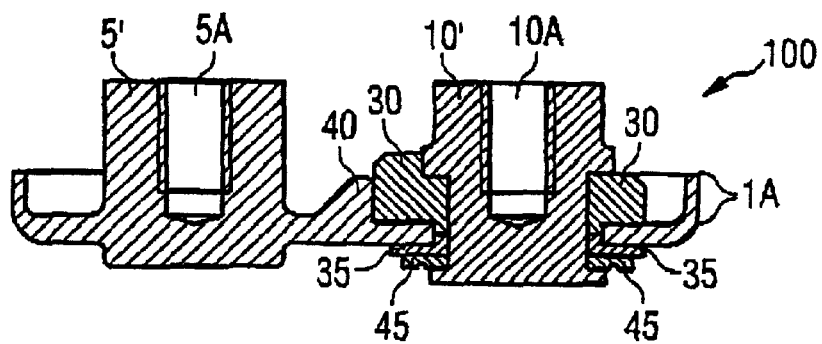
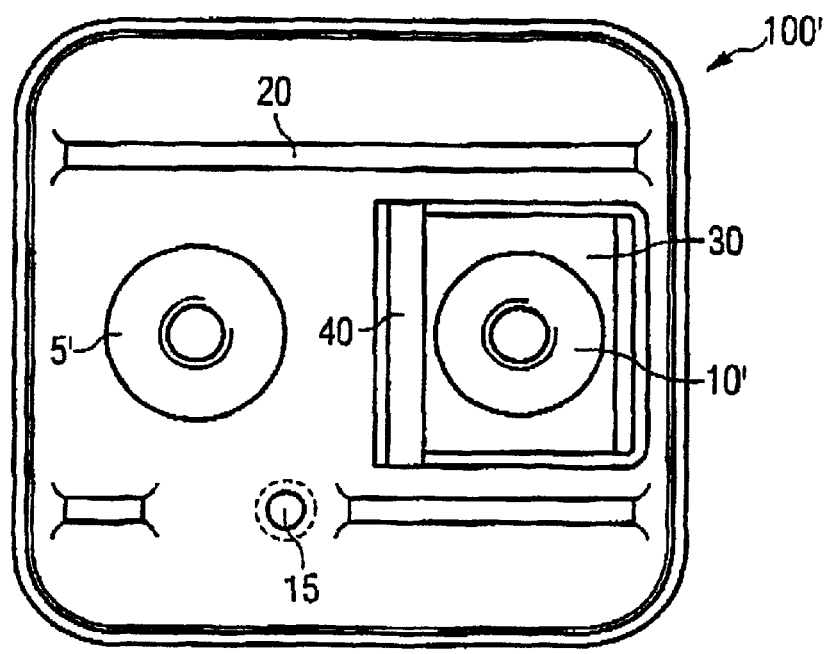

POT-SHAPED HOUSING AND COVER FOR CAPACITORS

BACKGROUND OF THE INVENTION

Capacitor windings are preferably accommodated in pot-shaped housings. These housings are limited at one side by a floor and are terminated at the other side by a cover. Two electrical terminals are usually located on the cover, and these terminals serve the purpose of contacting the capacitor winding that is impregnated with an electrolyte solution and located in the inside of the pot-shaped housing. Since the housing and, thus, the cover as well are charged with a potential, at least one of the electrical terminals must be electrically insulated from the rest of the cover to prevent a short.

Traditional covers usually comprise two openings through which the electrical terminals provided, for example, with a thread are passed and are then secured. Insulating disks are also employed for one electrical terminal in order to achieve an electrical insulation from the rest of the cover. In order to seal these electrical terminals so that no electrolyte solution can emerge toward the outside, these terminals are frequently welded, soldered or riveted. This is often extremely time-consuming and, thus, cost-incurring.

In order to eliminate the waste heat that occurs during the operation of the capacitor, the capacitors are often externally cooled, which likewise represents a considerable outlay.

In order to close the capacitor housing, the cover must often be firmly pressed into the opening of the housing, so that the cover must be especially stiff so that it does not warp while it is being pressed in. Frequently, covers which have thicker wall thicknesses are therefore utilized. This has the disadvantage that a high use of materials is also necessary for the cover.

Capacitor covers are usually milled from solid material given polygonal covers, so that the two openings are provided for conducting the electrical terminals through and an impregnation opening is also provided for the subsequent impregnation or introduction of the electrolyte to the capacitor windings located in the housing. The milling of the cover is thereby extremely time-consuming and, thus, a cost-intensive procedure. However, it is possible to manufacture the covers by extrusion. Since these covers and, thus, the extruded pot-shaped housing, however, are round, they have an increased space requirement in the bank of capacitors, due to unavoidable interspaces.

SUMMARY OF THE INVENTION

It is, thus, an object of the present invention to provide a pot-shaped capacitor housing with a cover that avoids the above-mentioned disadvantages.

The invention discloses a pot-shaped housing for a capacitor, whereby at least the cover was extruded from one piece of aluminum and the cover and the housing, respectively, comprise different spatial expanses along two principal axes. In addition, a first electrical terminal is fashioned on the cover and an opening is provided through which a second electrical terminal is passed. The peripheral edge of the cover is bent up in the direction of the pot opening and thereby comprises an all-around region that terminates in an interlocking fashion with the inside wall of the pot.

The advantage of the inventive cover is that all important features of the cover, which include at least a portion of the first electrical terminal, the opening for the second electrical terminal as well as the bent-over or bent-up edges of the cover, can be formed by extruding in a single method step. The bent-up, all-around edge of the cover thereby allows an especially advantageous interlocking contact with the pot-shaped housing, so that the cover can be terminated especially tightly, for example by either a tungsten inert gas welding or by a laser welding. Traditional capacitor housings often require particularly complicated seals and beads for the cover in order to be tightly terminated.

Another advantage of the inventive housing is that the first electrical terminal is already fashioned on the cover as a result of the extruding, so that, differing from traditional covers, it need not be separately conducted through an opening and then secured. In addition, the inventive housing and its cover comprise different expanses along two principal axes, so that the housing and its cover are non-round, for example are square or rectangular in shape, wherein the corners are often rounded-off. This has the advantage that the inventive housings can be arranged in a bank of capacitors in an especially easy and space-saving way.

In an advantageous development, it is possible to fashion fixing elements in the cover at the opening for the second electrical terminal that fix an insulation of the second electrical terminal. These fixing elements that, for example, can be fashioned in the form of a web or rib, especially advantageously allow the electrical insulation of the second terminal to be fixed, so that the second terminal can be tightly closed and protected against twisting.

It is also possible that at least one reinforcing and cooling element is fashioned on the cover of the capacitor. This reinforcing and cooling element can, for example, be fashioned in the form of at least one straight-line rib that is arranged on an outside of the cover. In an especially advantageous way, this rib is formed together with the rest of the cover by means of extruding. The reinforcing and cooling elements have the job of reinforcing the cover, so that it can be pressed especially well into the pot-shaped housing without warping. In addition, the forming of an elevation on the cover enlarges the surface of the cover, so that waste heat occurring during the operation of the capacitor can be better eliminated.

Especially strong forces act on the center of the cover while the cover is being pressed into the housing. An especially good stabilization of the cover thus results when the reinforcing elements are especially advantageously arranged centrally on the cover. In addition, it is especially advantageous when the straight-line ribs extend over a majority of at least one principal axis of the cover, since an especially good stabilization of the cover can now be achieved with this arrangement.

In an advantageous verison of the inventive housing, spacers can be fashioned on the cover. Thus, a printed circuit board that contacts the electrical terminals of the capacitors in a bank of capacitors lies, for example, against the spacers. For electrical insulation, electrically insulating material, for example plastic disks, can be located between the printed circuit board and the spacers. The advantage of such a cover is that the printed circuit boards can be especially advantageously supported so that one can prevent the printed circuit boards from touching parts of the cover that are not electrically insulated during operation so that no short circuit is formed. The spacers can, for example, be formed in the form of flattened elevations or pegs on the cover.

It is also possible that at least one impregnation hole is provided in the cover. This impregnation hole serves the purpose of allowing an impregnation of the capacitor windings already located in the capacitor housings with the electrolyte solution.

In another advantageous development of the housing, a rated break point can be formed in the cover. This break point is formed in a region that has a reduced wall thickness compared to the rest of the housing part or pot and a notch is additional formed in this region. Advantageously, the region having the reduced wall thicknesses formed by extruding and the additional notching is subsequently produced. The rated break point advantageously allows a controlled bursting of the capacitor given excessively high pressures in the capacitor housing, so that the electrolyte solution flows out in a controlled fashion and does not splatter.

The rated break point can be fashioned both in the cover as well as in the housing pot, whereby it is particularly advantageously fashioned in the floor of the housing pot.

A number of aluminum alloys, for example aluminum 99.5 or aluminum 99.9 as well as wrought aluminum alloys are especially advantageously used as the material capable of extruding.

Other advantages and features of the invention will be readily apparent from the following description of the preferred embodiments, the drawings and claims.

BRIEF DESCRIPTION OF THE DRAWINGS

FIG. 1 is a plan elevational view of a cover for a pot-shaped housing according to the present invention;

FIG. 2 is a cross-sectional view taken along the line II—II of FIG. 1;

FIG. 3 is a plan view of an embodiment of the cover for closing a pot-shaped housing for a capacitor in accordance with the present invention;

FIG. 4 is a cross-sectional view taken along the line IV—IV of FIG. 3;

FIG. 5 is a top plan view of a second embodiment of a cover for closing a pot-shaped housing for a capacitor in accordance with the present invention;

FIG. 6 is a cross-sectional view taken along the line VI—VI of FIG. 5;

FIG. 7 is a top plan view of a third embodiment of a cover for closing a pot-shaped housing for a capacitor in accordance with the present invention;

FIG. 8 is a cross-sectional view taken along the line VIII—VIII of FIG. 7;

FIG. 9 is a top plan view of a modification of the cover of FIG. 7;

DESCRIPTION OF THE PREFERRED EMBODIMENTS

Figure 10:
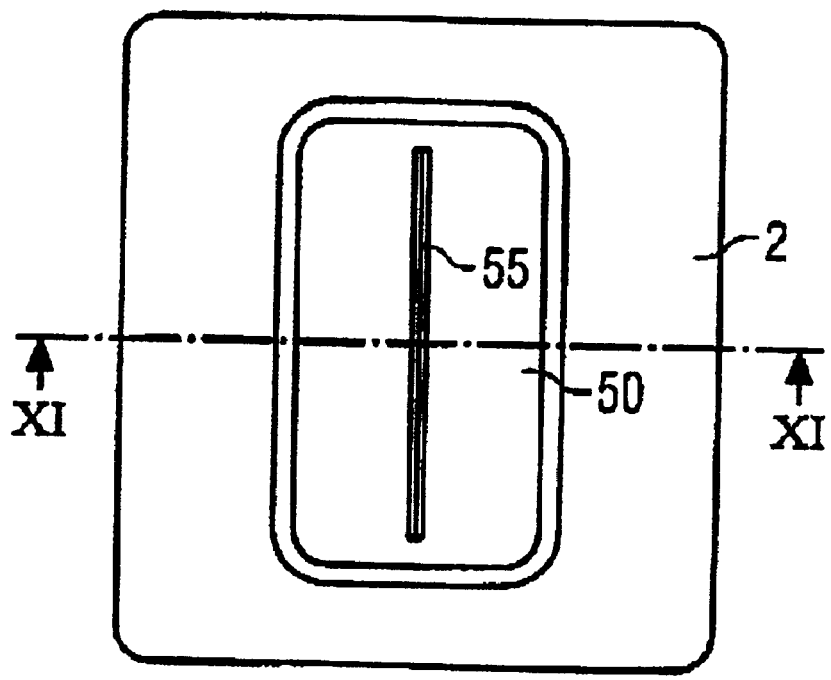
FIG. 10 is a bottom plan view of a housing pot having a rated break point in accordance with the present invention.

The principles of the present invention are particularly useful when incorporated in a rectangular capacitor cover or lid generally indicated at 1 in FIGS. 1 and 2, which cover is used to close a pot-shaped housing for capacitors. As illustrated, the capacitor cover 1 is formed by an extrusion process and has a first electrical terminal 5 in the form of an aluminum lug. The capacitor cover comprises an all-around edge 1A, which is bent upward, as shown in FIG. 2. In addition, the cover 1 includes reinforcing and cooling elements or ribs 20 and 20', an impregnation hole 15 as well as an opening 11 for receiving the second electrical terminal. As illustrated in FIG. 1, the reinforcing and cooling rib 20' extends over the entire expanse of at least one principal axis of the rectangular cover.

An embodiment of the cover generally indicated at 1' is shown in FIG. 3 and has an upturned edge 1A. As illustrated in FIG. 4, this cover is received in the open end of a housing pot 2 with an interlocking fashion. The cover 1' has a first electrical terminal 5' which is an upstanding cylindrical shaped peg or lug which has a blind bore 5A that is threaded. Thus, an electrical connection can be attached by a screw threaded into the blind bore 5A. In addition to having the lug 5', the cover 1' has peg-shaped spacers 25 which coact with a surface 25A of the first lug 5' for supporting a printed circuit board after providing proper insulation between the cover 1' and the printed circuit board, so that the printed circuit board will not contact the electrical terminals.

As illustrated in FIG. 4, the ribs 20, which serve as cooling and fixing elements, have a height, as illustrated in FIG. 4, which is less than the height of the surface 25A and the pegs 25.

FIGS. 5 and 6 show a second version or embodiment of the capacitor cover generally indicated at 1". In this arrangement, both of the terminals are formed as plug- or knife-type terminals (tab connectors). The first terminal 5", which is fashioned on the cover, is electrically conductively riveted through an opening in a portion 5C of a sheet of a first flat plug 5B. As illustrated, the portion 5C and the flat knife-type terminal 5B are fashioned as a one-piece member. The second electrical terminal 10 is shaped in the form of a separate component part that is electrically insulated from the rest of the cover by a seal 35 which, for example, is composed of rubber, for example ethylene-propylene-diene rubber, as well as by means of electrical insulation 30. The second electrical terminal 10 is tightly connected to the cover with an annular ridge 10D on a head of the terminal 10 digging into a seal ring 35. As illustrated, this, too, is like a rivet. The insulation 30 together with the flat plug 10B is riveted to the cover in an anti-twist fashion so that the second electrical terminal 10 extends through the perforated sheet 10C of the second flat plug 10B.

The sheet 10C and the flat plug 10B can be also fabricated as one piece and, in fact, can be similar to that of the one-piece members 5B and 5C. The assembly of capacitors and their contacting is considerably simplified and more dependable at the same time as a result of these flat plug terminals. Particularly given screwed terminals, a specific narrow tolerance torque must be adhered to in order to prevent an over-turning of the screw connection. Given the plug-type terminal shown here, this problem is eliminated. In addition to the terminals 5" and 10, the cover 1"includes an impregnation hole 15 which is located in the middle of the cover and is shown as being in a raised portion.

FIGS. 7 and 8 show a third embodiment of a cover generally indicated at 100. As illustrated in FIG. 7, this cover 100 includes a first terminal 5', a second terminal 10' and an impregnation hole 15 which is offset from the center line. The first terminal 5' is similar to the terminal 5' of the second embodiment shown in FIGS. 3 and 4 and has a threaded blind hole 5A. The terminal 10' has a threaded blind hole 10A for receiving a screw-type connector member. The terminal 10' is inserted in a hole in the lid and is provided with the electrical insulation 30 plus an electrical insulating seal 35 along with an aluminum washer 45 which is secured by riveting with the washer applying pressure on the seal 35. To prevent twisting, the cover 100 has a fixing element or ridge 40 which engages a flat side of the insulation 30 (see FIG. 7). As illustrated, it can be seen that the fixing element or ridge 40 extends over the entire length of the seal 30.

While the embodiment of FIGS. 7 and 8 does not show any reinforcing ribs, they can also be formed therein during the extrusion of the aluminum cover 100.

A modification of the cover 100' is shown in FIG. 9. This modification has a square configuration with rounded corners instead of the rectangular configuration of the cover 100. In addition, it is provided with reinforcing and cooling ribs, such as 20, at least one of which extends substantially the full extent across the cover 100' between two opposite edges.

Figure 11:
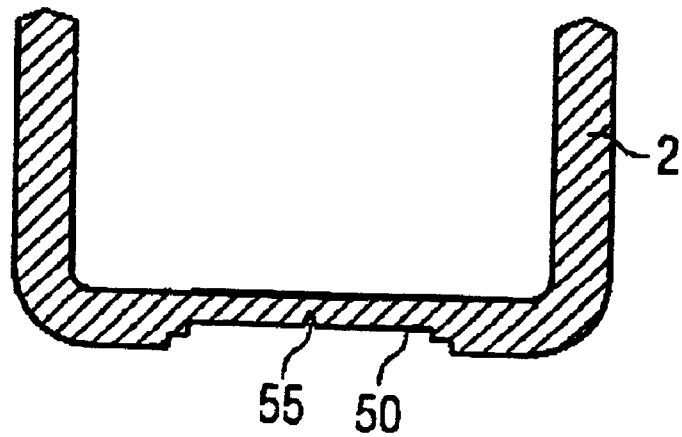
FIG. 11 is a cross-sectional view taken along the line XI—XI of FIG. 10.

As illustrated in FIGS. 10 and 11, a housing pot 2 is shown in cross-section and has a region 50 having a reduced wall thickness in the floor or base of the housing, which reduced wall thickness is formed during the extrusion of the housing pot 2. In addition, a notch 55 is provided in the region 50. This rated break point enables an especially controlled tearing of the capacitor housing given an excess internal pressure. On the basis of an especially precise setting of the depth of the notch 5, the rated break point can thereby be formed that responds especially sensitively to internal pressures in the housing below 10 bar. While the rated brake point is shown in the floor or base of the housing 2 in FIGS. 10 and 11, it could also be provided in a cover. It is also noted that the notch 55 extends over nearly the entire length of the region 50.

Although various minor modifications may be suggested by those versed in the art, it should be understood that we wish to embody within the scope of the patent granted hereon all such modifications as reasonably and properly come within the scope of our contribution to the art.

We claim:

1. A pot-shaped housing for capacitors with a cover, said housing being an extruded one-piece member with an opening, said cover and pot-shaped housing having different spatial expanses along two principal axes, said cover being an extruded one-piece member having an upstanding peripheral edge extending in the direction of the opening to close the opening of the pot-shaped housing in an interlocking fashion, at least a portion of a first electrical terminal being formed as part of the cover, and an opening provided in the cover through which a second electrical terminal is passed.

2. A pot-shaped housing according to claim 1, wherein the cover has an integral fixing element for fixing insulation of the second electrical terminal at the opening in the cover.

3. A pot-shaped housing according to claim 2, wherein the fixing element is fashioned as an upstanding ridge on the cover.

4. A pot-shaped housing according to claim 1, wherein the extruded cover has at least one integral reinforcing and cooling element extending from an upper surface thereof.

5. A pot-shaped housing according to claim 4, wherein the reinforcing and cooling element is fashioned in the form of at least one straight-line rib that is arranged on an outer surface of the cover.

6. A pot-shaped housing according to claim 4, wherein the reinforcing and cooling element is centrally arranged on the cover.

7. A pot-shaped housing according to claim 4, wherein the at least one reinforcing and cooling element is a straight-line rib extending over a majority of at least one principal axis of the cover.

8. A pot-shaped housing according to claim 1, which includes spacers being formed on an outer surface of the cover.

9. A pot-shaped housing according to claim 8, wherein the spacers are formed on the cover as flattened elevations.

10. A pot-shaped housing according to claim 1, wherein the cover is provided with at least one impregnation hole.

11. A pot-shaped housing according to claim 1, which includes a rated break point being formed in one of the housing and cover, said break point being a region having a reduced wall thickness compared to the rest of the element and having a notch formed in said region.

12. A pot-shaped housing according to claim 11, wherein the rated break point is formed in a floor of the housing pot with the region with the reduced wall thickness compared to the rest of the housing and the notch being additionally formed in this region.

13. A pot-shaped housing according to claim 1, wherein the housing and cover are essentially rectangular in shape.

14. A bank of capacitors comprising at least two pot-shaped housings with a cover, each of said pot-shaped housings containing a capacitor, each of said housings being an extruded one-piece member with an opening, said covers and pot-shaped housings having different spatial expanses along two principal axes, each of said covers being an extruded one-piece member having an upstanding peripheral edge extending in the direction of the opening to close the opening of the pot-shaped housing in an interlocking fashion, at least a portion of a first electrical terminal being formed as part of each cover, and an opening provided in each cover through which a second electrical terminal is passed.

* * * * *